United States Patent
Bai et al.

(10) Patent No.: US 11,225,594 B1
(45) Date of Patent: Jan. 18, 2022

(54) DRILLING FLUID FOR ENHANCING STRATUM PRESSURE BEARING CAPACITY AND PREPARATION METHOD AND METHOD OF USING THEREOF

(71) Applicant: Southwest Petroleum University, Chengdu (CN)

(72) Inventors: Yang Bai, Chengdu (CN); Pingya Luo, Chengdu (CN); Hao Zhang, Chengdu (CN); Cheng Li, Chengdu (CN); Yan Cheng, Chengdu (CN); Guojun Li, Chengdu (CN); Chunyan Liu, Chengdu (CN); Hongbo Li, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/201,862

(22) Filed: Mar. 15, 2021

(30) Foreign Application Priority Data

Oct. 10, 2020 (CN) .......................... 202011077074.7

(51) Int. Cl.
*C09K 8/035* (2006.01)
*C09K 8/20* (2006.01)

(52) U.S. Cl.
CPC .................................. *C09K 8/206* (2013.01)

(58) Field of Classification Search
CPC ........ C09K 8/24; C09K 2208/10; C09K 8/03; C09K 8/12; C09K 8/203; C09K 8/506; C09K 8/032; C09K 8/035; C09K 8/04; C09K 8/145; C09K 8/16; C09K 8/206; C09K 8/426; C09K 8/44; C09K 8/5045; C09K 8/02

See application file for complete search history.

(56) References Cited

FOREIGN PATENT DOCUMENTS

| CN | 102952526 | * | 3/2013 |
|----|-----------|---|--------|
| CN | 104762070 | * | 7/2015 |
| CN | 105331338 | * | 2/2016 |
| CN | 108587578 | * | 9/2018 |

* cited by examiner

*Primary Examiner* — Kumar R Bhushan
(74) *Attorney, Agent, or Firm* — Volpe Koenig

(57) ABSTRACT

The present invention relates to a drilling fluid for enhancing stratum pressure bearing capacity, and a method of preparing and using the drilling fluid. The drilling fluid comprises water, bentonite, low adhesive aggregation anionic cellulose, lignite resin, high temperature resistant and salt resistant filtrate reducer, silanol inhibitor, inorganic micrometer-nanometer rigid particles and emulsified asphalt. The bentonite is 2-9 parts by weight, the low adhesive aggregation anionic cellulose is 0.1-1 parts by weight, the lignite resin is 1-5 parts by weight, the high temperature resistant and salt resistant filtrate reducer is 0.1-2 parts by weight, the silanol inhibitor is 0.1-2 parts by weight, the inorganic micrometer-nanometer rigid particles are 0.5-5 parts by weight, and the emulsified asphalt is 1-10 parts by weight, based on 100 parts by weight of water.

16 Claims, No Drawings

DRILLING FLUID FOR ENHANCING STRATUM PRESSURE BEARING CAPACITY AND PREPARATION METHOD AND METHOD OF USING THEREOF

FIELD

The present disclosure relates to the technical field of drilling mud for the petroleum industry, specifically relates to a drilling fluid for enhancing stratum pressure bearing capacity and a preparation method and a method of using thereof.

BACKGROUND

The conventional drilling fluid has some defects under the impact of sustained high pressure during a process of drilling deep stratum, such as widespread thickening phenomenon, drastic contradiction between the rheological property and filtrate loss & wall-building performance, can be easily polluted by salt, paste and calcium contamination, thereby causing performance deterioration of the drilling fluid, complicated maintenance and treatment, and even a series of downhole troublesome conditions. In general, the stratum collapse sites have a large number of crevices, when the drilling tools are drilling into the collapsed stratum, the drilling fluid will rapidly flow into the stratum along the crevices, and the mud shale will be hydrated, swelled and dispersed when contacting with water, causing hole enlargement, hole shrinkage, collapse, sticking of the drilling tools, and other downhole troublesome conditions. The well leakage resulting from low stratum pressure bearing capability is a bottleneck for achieving the objectives of securely and efficiently drilling wells.

SUMMARY

The object of the present disclosure is to overcome the problems in the prior art such as block falling, adherency and sticking of drilling tools, and well leakage during the drilling process due to low stratum pressure bearing capacity in the drilling operation of weak or deep stratum, and provides a drilling fluid for enhancing stratum pressure bearing capacity, and a preparation method and a method of using thereof, wherein the drilling fluid has high stratum pressure bearing capacity and produces excellent leaking stoppage effect when used in weak or deep stratum.

In order to achieve the above objects, a first aspect of the present disclosure is to provide a drilling fluid for enhancing stratum pressure bearing capacity, wherein the drilling fluid comprises water, bentonite, low adhesive aggregation anionic cellulose, lignite resin, high temperature resistant and salt resistant filtrate reducer, silanol inhibitor, inorganic micrometer-nanometer rigid particles and emulsified asphalt;

the bentonite is 2-9 parts by weight, the low adhesive aggregation anionic cellulose is 0.1-1 parts by weight, the lignite resin is 1-5 parts by weight, the high temperature resistant and salt resistant filtrate reducer is 0.1-2 parts by weight, the silanol inhibitor is 0.1-2 parts by weight, the inorganic micrometer-nanometer rigid particles are 0.5-5 parts by weight, and the emulsified asphalt is 1-10 parts by weight, based on 100 parts by weight of water.

In a second aspect, the present disclosure provides a method of preparing the drilling fluid for enhancing stratum pressure bearing capacity of the present disclosure, wherein the preparation method comprises the following steps:

(1) subjecting the bentonite to a pre-hydration treatment to obtain a pre-hydrated bentonite slurry;

(2) stirring and mixing the pre-hydrated bentonite slurry obtained in step (1) with low adhesive aggregation anionic cellulose, lignite resin, high temperature resistant and salt resistant filtrate reducer, silanol inhibitor, inorganic micrometer-nanometer rigid particles and emulsified asphalt to produce the drilling fluid.

In a third aspect, the present disclosure provides a method of using the drilling fluid of the present disclosure in the well drilling operation.

Due to the aforementioned technical solution, the present disclosure provides a drilling fluid for enhancing stratum pressure bearing capacity and a preparation method and a method of using thereof, and produces the following favorable effects:

The drilling fluid having high stratum pressure bearing capacity provided by the present disclosure can effectively increase strength of the drilling fluid and mud cake, greatly enhance performance of the drilling fluid system for resisting block falling as well as adherency and sticking of drilling tools during the well drilling operation, thereby achieving the objects of enhancing stratum pressure bearing capacity and significantly improving the plugging performance of the drilling fluid.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

In a first aspect, the present disclosure provides a drilling fluid for enhancing stratum pressure bearing capacity, wherein the drilling fluid comprises water, bentonite, low adhesive aggregation anionic cellulose, lignite resin, high temperature resistant and salt resistant filtrate reducer, silanol inhibitor, inorganic micrometer-nanometer rigid particles and emulsified asphalt;

the bentonite is 2-9 parts by weight, the low adhesive aggregation anionic cellulose is 0.1-1 parts by weight, the lignite resin is 1-5 parts by weight, the high temperature resistant and salt resistant filtrate reducer is 0.1-2 parts by weight, the silanol inhibitor is 0.1-2 parts by weight, the inorganic micrometer-nanometer rigid particles are 0.5-5 parts by weight, and the emulsified asphalt is 1-10 parts by weight, based on 100 parts by weight of water.

In the present disclosure, the interaction between the constituents by strictly controlling the content of individual constituent allows the prepared drilling fluid to exert the optimal effects during the well drilling process, such that the prepared drilling fluid can enhance the stratum pressure bearing capacity, prevent collapse, block falling and instability of the borehole wall, and maintain stability of the borehole wall, thereby producing desirable application effects.

In the present disclosure, the inorganic micrometer-nanometer rigid particles refer to the inorganic rigid particles having a particle size of 0.1-50 µm, and the inorganic micrometer-nanometer rigid particles comprise both nanometer particles and micrometer particles.

According to the present disclosure, the bentonite is 3-5 parts by weight, the low adhesive aggregation anionic cellulose is 0.3-0.7 parts by weight, the lignite resin is 1.5-3 parts by weight, the high temperature resistant and salt resistant filtrate reducer is 0.5-1.5 parts by weight, the silanol inhibitor is 0.5-1.5 parts by weight, the inorganic micrometer-nanometer rigid particles are 1-3 parts by weight, and the emulsified asphalt is 1.5-5 parts by weight, based on 100 parts by weight of water.

In the present disclosure, the bentonite may be the xinjiang Xiazijie bentonite purchased from the Xinjiang Nonmetallic Minerals Xiazijie Bentonite Co., Ltd.

According to the present disclosure, the low adhesive aggregation anionic cellulose is a cellulose ether-based derivative, preferably a water-soluble cellulose ether-based derivative.

In the present disclosure, the low adhesive aggregation anionic cellulose is commercially available, for example, the low adhesive aggregation anionic cellulose with a product grade PAC-HV and/or PAC-LV purchased from the Qingzhou Clear Spring Cellulose Factory in Shandong Province; preferably, the low adhesive aggregation anionic cellulose with a product grade PAC-LV.

According to the present disclosure, the lignite resin is a condensed polycyclic aromatic organic compound.

In the present disclosure, the condensed polycyclic aromatic organic compound comprises humic acid and humin. In the present disclosure, the lignite resin contains a large amount of active functional groups, conjugated groups and weak chemical bonds, and is readily subjected to polymerization or condensation polymerization with monomers of organic polymers (e.g., ethylene, propylene, acrylonitrile, acrylamide) to form macromolecular organic polymers in the presence of initiators. Specifically, the lignite resin is commercially available, for example, the lignite resin with a model SPNH purchased from Chengdu Chuanfeng Chemical Engineering Co., Ltd.

According to the present disclosure, the high temperature resistant and salt resistant filtrate reducer is a polymer comprising a structural unit derived from 2-acrylamido-2-methylpropanesulfonic acid.

In the present disclosure, the high temperature resistant and salt resistant filtrate reducer is commercially available, for example, the product with a model number BDF-100S purchased from Tianjin PetroChina Boxing Engineering Technology Co., Ltd.

According to the present disclosure, the silanol inhibitor is prepared from tertiary chlorosilane and ethanol.

In the present disclosure, the silanol inhibitor is an organosilicone drilling fluid inhibitor derived from the hydrolysis and alcoholysis of tertiary chlorosilane and ethanol. It is capable of adsorbing clay particles and surface of the borehole wall, preventing the clay particles from freely penetrating the stratum, effectively inhibiting the hydration decomposition of the clay particles and the hydration expansion of the earth layer, so as to stabilize the borehole wall. In addition, the silanol inhibitor can improve the flow properties of the drilling fluid and the quality of the filter cake, and is a desirable organic small-molecule inhibitor. The silanol inhibitor is commercially available, for example, the product with a model high performance silanol viscosity-reducing agent, purchased from Beijing Zhicheng Huixin New Material Co., Ltd.

According to the present disclosure, the inorganic micrometer-nanometer rigid particles comprise inorganic micrometer-nanometer rigid particles I having a particle size of 0.1-10 μm and inorganic micrometer-nanometer rigid particles II having a particle size of 10-20 μm.

In the present disclosure, the use of two kinds of inorganic micrometer-nanometer rigid particles with different particle sizes in cooperation with each other can facilitate formation of a stable mud cake structure between the wellbore and the stratum, thereby effectively improving the stratum conditions.

Moreover, in order to further improve the stratum conditions, it is preferable that the inorganic micrometer-nanometer rigid particles comprise inorganic micrometer-nanometer rigid particles I having a particle size of 1-5 μm and inorganic micrometer-nanometer rigid particles II having a particle size of 8-16 μm.

In the present disclosure, the inorganic micrometer-nanometer rigid particles are commercially available, for example, from the Sichuan Guangya Polymer Chemical Co., Ltd. (GYPC), with the model Numbers ZD-1 and ZD-2.

According to the present disclosure, the weight ratio of the inorganic micrometer-nanometer rigid particles I to the inorganic micrometer-nanometer rigid particles II is 0.8-1.5:1.

In the present disclosure, two kinds of inorganic micrometer-nanometer rigid particles having different particle sizes are used in cooperation with each other in the specific content and ratio to facilitate formation of a stable mud cake structure between the wellbore and the stratum, thereby effectively improving the stratum conditions.

According to the present disclosure, still further, the weight ratio of the inorganic micrometer-nanometer rigid particles I to the inorganic micrometer-nanometer rigid particles II is 1:1.

In the present disclosure, the emulsified asphalt is in the order of micrometers, and the surface is positively charged, so that the asphalt particulates are extremely easily adsorbed on the negatively charged solid particles, so as to participate formation of a mud cake, improve the quality of the mud cake; in addition, the emulsified asphalt particulates and the cationic shale inhibitor can enter into micro-fractures of the borehole wall, cause adhesion and mutual aggregation, thereby producing the effects of plugging, bridging, preventing swell and collapse, reducing water loss, and protecting oil and gas reservoirs. The emulsified asphalt has a particle size of 10-150 μm, preferably 30-90 μm.

In the present disclosure, the emulsified asphalt is commercially available, for example, from the Southwest Petroleum University Jinniu Petroleum Technology Company, with the model EP-1 and/or EP-2; the emulsified asphalt with a model EP-2 is preferred.

In the present disclosure, a stable mud cake structure can be formed between the wellbore and the stratum through the mutual cooperation of two kinds of inorganic micrometer-nanometer rigid particles having different particle sizes with the emulsified asphalt, thereby effectively improving the stratum conditions.

According to the present disclosure, the drilling fluid further comprises a weighting agent.

According to the present disclosure, the weighting agent is 1-5 parts by weight, preferably 1-3 parts by weight based on 100 parts by weight of water.

In the present disclosure, the weighting agent is barite, which is commercially available, for example, from the Shijiazhuang Xinbo Mineral Products Co., Ltd. in Hebei Province, with a product grade of ultra-fine barium sulfate.

In a second aspect, the present disclosure provides a preparation method of the drilling fluid for enhancing stratum pressure bearing capacity of the present disclosure, wherein the preparation method comprises the following steps:

(1) subjecting the bentonite to a pre-hydration treatment to obtain a pre-hydrated bentonite slurry;

(2) stirring and mixing the pre-hydrated bentonite slurry obtained in step (1) with low adhesive aggregation anionic cellulose, lignite resin, high temperature resistant and salt resistant filtrate reducer, silanol inhibitor, inorganic micrometer-nanometer rigid particles and emulsified asphalt to produce the drilling fluid.

According to the present disclosure, the conditions of pre-hydration treatment comprise: adding 3-5 parts by weight of bentonite to 100 parts by weight of water under the first stirring conditions to obtain a mixture; adding sodium carbonate to the mixture and blending under the second stirring conditions and standing still to obtain a pre-hydrated bentonite slurry.

In the present disclosure, after subjecting the bentonite to a pre-hydration treatment, the calcium ions and/or magnesium ions in the bentonite can be removed, thereby significantly improving the slurry production ratio of the bentonite.

According to the present disclosure, the first stirring conditions and the second stirring conditions each independently comprise a stirring speed of 500-1,500 r/min and a stirring time of 2-4 hours.

According to the present disclosure, the sodium carbonate is used in an amount of 0.08-0.12 parts by weight, relative to 100 parts by weight of water.

According to the present disclosure, the conditions of standing still comprise a standing temperature of 20-30° C. and a standing time of 16-24 hours.

In a third aspect, the present disclosure provides a method of using the drilling fluid of the present disclosure in the well drilling operation.

The present disclosure will be described in detail with reference to examples. In the following examples, The electronic balance with a precision 0.0001 g, was purchased from the Shanghai Tianping Instrument Factory.

The Bentonite was xinjiang Xiazijie bentonite purchased from the Xinjiang Nonmetallic Minerals Xiazijie Bentonite Co., Ltd.;

The low adhesive aggregation anionic cellulose with a product grade PAC-LV was purchased from the Qingzhou Clear Spring Cellulose Factory in Shandong Province;

The lignite resin with a model SPNH was purchased from Chengdu Chuanfeng Chemical Engineering Co., Ltd.;

The high temperature resistant and salt resistant filtrate reducer with a model BDF-100S was purchased from Tianjin PetroChina Boxing Engineering Technology Co., Ltd.;

The silanol inhibitor with a model high performance silanol viscosity-reducing agent was purchased from Beijing Zhicheng Huixin New Material Co., Ltd.;

The inorganic micrometer-nanometer rigid particles I with a model number ZD-1 and an average particle size of 3.4 μm was purchased from Sichuan Guangya Polymer Chemical Co., Ltd. (GYPC);

The inorganic micrometer-nanometer rigid particles II with a model number ZD-2 and an average particle size of 9.23 μm was purchased from Sichuan Guangya Polymer Chemical Co., Ltd.;

The inorganic micrometer-nanometer rigid particles III with a model number GZD-1 and an average particle size of 15.8 μm was purchased from Sichuan Guangya Polymer Chemical Co., Ltd.;

The inorganic micrometer-nanometer rigid particles IV with a model number GZD-2 and an average particle size of 26.34 μm was purchased from Sichuan Guangya Polymer Chemical Co., Ltd.;

The emulsified asphalt with a model EP-2 and an average particle size of 43.5 μm was purchased from the Southwest Petroleum University Jinniu Petroleum Technology Company;

The emulsified asphalt with a model EQS-2 and an average particle size of 103.54 μm was purchased from the Southwest Petroleum University Jinniu Petroleum Technology Company;

The weighting agent barite with a product grade of ultra-fine barium sulfate was purchased from the Shijiazhuang Xinbo Mineral Products Co., Ltd. in Hebei Province.

Example 1

The drilling fluid was prepared with the following steps: 100 parts by weight water were weighted, 4 parts by weight of bentonite was added under the electric stirring with a low speed of 1,000 r/min; after stirring for 3 hours, 0.10 parts by weight $Na_2CO_3$ was added and subjected to further stirring for 3 hours, and standing still for 24 hours under the room temperature to perform the pre-hydration treatment; 0.5 parts by weight of low adhesive aggregation anionic cellulose with a product grade PAC-LV was added under the electric stirring for 15 minutes with a high speed of 5,000 r/min, 5 parts by weight of filtrate reducer with a model SMP-II was added and subjected to stirring for 10 minutes; 0.2 parts by weight lignite resin with a model SPNH was further added and subjected to stirring for 10 minutes; 0.8 parts by weight of high temperature resistant and salt resistant filtrate reducer with a model BDF-100S and 0.5 parts by weight of the silanol inhibitor with a model high performance silanol viscosity-reducing agent were added and subjected to stirring for 15 minutes; 1 part by weight of inorganic micrometer-nanometer rigid particles I and 1 part by weight of inorganic micrometer-nanometer rigid particles II were added and subjected to stirring for 15 minutes; 2 parts by weight of the emulsified asphalt with a model EP-2 was added and subjected to stirring for 15 minutes, 400 parts by weight of the weighting agent barite was added and subjected to stirring for 15 minutes.

The results of the High Temperature High Pressure (HTHP) filtrate loss measurement of the drilling fluid and the performance test of the mud cake were shown in Table 1.

Example 2

A drilling fluid was prepared according to the same method as in Example 1, except that 1 part by weight of the inorganic micrometer-nanometer rigid particles I used in Example 1 was replaced with 1.5 parts by weight of the inorganic micrometer-nanometer rigid particles I; and 1 part by weight of the inorganic micrometer-nanometer rigid particles II used in Example 1 was replaced with 1.5 parts by weight of the inorganic micrometer-nanometer rigid particles II, so as to prepare the drilling fluid.

The results of the HTHP filtrate loss measurement of the drilling fluid and the performance test of the mud cake were shown in Table 1.

Example 3

A drilling fluid was prepared according to the same method as in Example 1, except that 1 part by weight of the inorganic micrometer-nanometer rigid particles I used in Example 1 was replaced with 2 parts by weight of the inorganic micrometer-nanometer rigid particles I; and 1 part by weight of the inorganic micrometer-nanometer rigid particles II used in Example 1 was replaced with 2 parts by weight of the inorganic micrometer-nanometer rigid particles II, so as to prepare the drilling fluid.

The results of the HTHP filtrate loss measurement of the drilling fluid and the performance test of the mud cake were shown in Table 1.

Example 4

A drilling fluid was prepared according to the same method as in Example 1, except that 2 parts by weight of the emulsified asphalt with a model EP-2 used in Example 1 was replaced with 3 parts by weight of the emulsified asphalt with a model EP-2.

The results of the HTHP filtrate loss measurement of the drilling fluid and the performance test of the mud cake were shown in Table 1.

Example 5

A drilling fluid was prepared according to the same method as in Example 1, except that 2 parts by weight of the emulsified asphalt with a model EP-2 used in Example 1 was replaced with 4 parts by weight of the emulsified asphalt with a model EP-2.

The results of the HTHP filtrate loss measurement of the drilling fluid and the performance test of the mud cake were shown in Table 1.

Example 6

A drilling fluid was prepared according to the same method as in Example 1, except that 2 parts by weight of the emulsified asphalt with a model EP-2 used in Example 1 was replaced with 5 parts by weight of the emulsified asphalt with a model EP-2.

The results of the HTHP filtrate loss measurement of the drilling fluid and the performance test of the mud cake were shown in Table 1.

Example 7

A drilling fluid was prepared according to the same method as in Example 1, except that 2 parts by weight of the emulsified asphalt with a model EP-2 used in Example 1 was replaced with 6 parts by weight of the emulsified asphalt with a model EP-2.

The results of the HTHP filtrate loss measurement of the drilling fluid and the performance test of the mud cake were shown in Table 1.

Example 8

A drilling fluid was prepared according to the same method as in Example 2, except that 2 parts by weight of the emulsified asphalt with a model EP-2 used in Example 2 was replaced with 3 parts by weight of the emulsified asphalt with a model EP-2.

The results of the HTHP filtrate loss measurement of the drilling fluid and the performance test of the mud cake were shown in Table 1.

Example 9

A drilling fluid was prepared according to the same method as in Example 2, except that 2 parts by weight of the emulsified asphalt with a model EP-2 used in Example 2 was replaced with 4 parts by weight of the emulsified asphalt with a model EP-2.

The results of the HTHP filtrate loss measurement of the drilling fluid and the performance test of the mud cake were shown in Table 1.

Example 10

A drilling fluid was prepared according to the same method as in Example 2, except that 2 parts by weight of the emulsified asphalt with a model EP-2 used in Example 2 was replaced with 5 parts by weight of the emulsified asphalt with a model EP-2.

The results of the HTHP filtrate loss measurement of the drilling fluid and the performance test of the mud cake were shown in Table 1.

Example 11

A drilling fluid was prepared according to the same method as in Example 2, except that 2 parts by weight of the emulsified asphalt with a model EP-2 used in Example 2 was replaced with 6 parts by weight of the emulsified asphalt with a model EP-2.

The results of the HTHP filtrate loss measurement of the drilling fluid and the performance test of the mud cake were shown in Table 1.

Example 12

A drilling fluid was prepared according to the same method as in Example 3, except that 2 parts by weight of the emulsified asphalt with a model EP-2 used in Example 3 was replaced with 3 parts by weight of the emulsified asphalt with a model EP-2.

The results of the HTHP filtrate loss measurement of the drilling fluid and the performance test of the mud cake were shown in Table 1.

Example 13

A drilling fluid was prepared according to the same method as in Example 3, except that 2 parts by weight of the emulsified asphalt with a model EP-2 used in Example 3 was replaced with 4 parts by weight of the emulsified asphalt with a model EP-2.

The results of the HTHP filtrate loss measurement of the drilling fluid and the performance test of the mud cake were shown in Table 1.

Example 14

A drilling fluid was prepared according to the same method as in Example 3, except that 2 parts by weight of the emulsified asphalt with a model EP-2 used in Example 3 was replaced with 5 parts by weight of the emulsified asphalt with a model EP-2.

The results of the HTHP filtrate loss measurement of the drilling fluid and the performance test of the mud cake were shown in Table 1.

Example 15

A drilling fluid was prepared according to the same method as in Example 3, except that 2 parts by weight of the emulsified asphalt with a model EP-2 used in Example 3 was replaced with 6 parts by weight of the emulsified asphalt with a model EP-2.

The results of the HTHP filtrate loss measurement of the drilling fluid and the performance test of the mud cake were shown in Table 1.

Example 16

A drilling fluid was prepared according to the same method as in Example 2, except that the inorganic micrometer-nanometer rigid particles II were added in an amount of 0 part by weight.

The results of the HTHP filtrate loss measurement of the drilling fluid and the performance test of the mud cake were shown in Table 1.

Example 17

A drilling fluid was prepared according to the same method as in Example 2, except that the inorganic micrometer-nanometer rigid particles I were added in an amount of 0 part by weight.

The results of the HTHP filtrate loss measurement of the drilling fluid and the performance test of the mud cake were shown in Table 1.

Example 18

A drilling fluid was prepared according to the same method as in Example 3, except that the inorganic micrometer-nanometer rigid particles II were added in an amount of 0 part by weight.

The results of the HTHP filtrate loss measurement of the drilling fluid and the performance test of the mud cake were shown in Table 1.

Example 19

A drilling fluid was prepared according to the same method as in Example 3, except that the inorganic micrometer-nanometer rigid particles I were added in an amount of 0 part by weight.

The results of the HTHP filtrate loss measurement of the drilling fluid and the performance test of the mud cake were shown in Table 1.

Example 20

A drilling fluid was prepared according to the same method as in Example 2, except that the inorganic micrometer-nanometer rigid particles III was used for replacing the inorganic micrometer-nanometer rigid particles I.

The results of the HTHP filtrate loss measurement of the drilling fluid and the performance test of the mud cake were shown in Table 1.

Example 21

A drilling fluid was prepared according to the same method as in Example 2, except that the inorganic micrometer-nanometer rigid particles IV was used for replacing the inorganic micrometer-nanometer rigid particles II.

The results of the HTHP filtrate loss measurement of the drilling fluid and the performance test of the mud cake were shown in Table 1.

Example 22

A drilling fluid was prepared according to the same method as in Example 2, except that the emulsified asphalt with a model EQS-1 was used for replacing the emulsified asphalt with a model EP2.

The results of the HTHP filtrate loss measurement of the drilling fluid and the performance test of the mud cake were shown in Table 1.

Example 23

A drilling fluid was prepared according to the same method as in Example 2, except that the used amounts of the inorganic micrometer-nanometer rigid particles I and the inorganic micrometer-nanometer rigid particles II were 1.5 parts by weight and 1 part by weight, respectively, so that the weight ratio of the inorganic micrometer-nanometer rigid particles I to the inorganic micrometer-nanometer rigid particles II was 1.5:1.

The results of the HTHP filtrate loss measurement of the drilling fluid and the performance test of the mud cake were shown in Table 1.

Comparative Example 1

A drilling fluid was prepared according to the same method as in Example 2, except that the inorganic micrometer-nanometer rigid particles II and the inorganic micrometer-nanometer rigid particles I were respectively added in an amount of 0 part by weight.

The results of the HTHP filtrate loss measurement of the drilling fluid and the performance test of the mud cake were shown in Table 1.

Comparative Example 2

A drilling fluid was prepared according to the same method as in Example 2, except that the emulsified asphalt with a model EP-2 was added in an amount of 0 part by weight.

The results of the HTHP filtrate loss measurement of the drilling fluid and the performance test of the mud cake were shown in Table 1.

Comparative Example 3

A drilling fluid was prepared according to the same method as in Example 3, except that the emulsified asphalt with a model EP-2 was added in an amount of 0 part by weight.

The results of the HTHP filtrate loss measurement of the drilling fluid and the performance test of the mud cake were shown in Table 1.

Test Example 1

The drilling fluids prepared in the Examples 1-23 and Comparative examples 1-3 were respectively taken in a suitable amount, and the high-temperature and high-pressure filtrate loss amounts of the drilling fluids were tested by using a high-temperature and high-pressure filtrate loss instrument, the thickness of the mud cakes and the lubrication coefficient of the mud cakes was measured, thereby reflecting the magnitude of the filtrate loss amounts of the drilling fluids and the quality of the formed mud cakes. The test results were illustrated in Table 1.

The high-temperature and high-pressure filtrate loss amounts and the thickness of mud cakes were tested under the conditions consisting of a temperature of 120° C. and a pressure differential of 3.5 MPa by using a high-temperature and high-pressure water loss meter with a model GGS71-A manufactured by the Qingdao Hengtaida Electromechanical Equipment Co., Ltd. in Shandong Province, the specific test method was as follows:

(1) the drilling fluid stirred at high speed was injected into a filter bowl with the liquid level having a distance of a millimeter from the top, and the filter paper was loaded;

(2) the filter bowl was installed, and the upper and lower valve stems were fastened;

(3) the filtrate receiver was connected to the lower valve stem at the bottom of the filter bowl and locked, the pressure regulator which was capable of adjusting pressure was connected with a pressure source and mounted to the upper valve stem and locked up;

(4) the upper and lower regulators were adjusted to kilopascal (KPa) after the upper and lower valve stems were fastened, the upper valve stem unfolded to release pressure into the filter bowl, the pressure was maintained to the desired temperature, and the temperature was kept constant;

(5) upon reaching the temperature, the top pressure was increased, the bottom valve stem was simultaneously opened up to initiate collection of the filtrate and the timing was started, the test temperature was kept within a range of ±5° C., the filtrate was collected; during the measuring process, if the back pressure device of the filtrate receiver exceeded a threshold, a portion of the filtrate may be carefully removed from the filtrate receiver, such that the pressure was dropped and the filtrate volume was recorded;

(6) after the experiment was completed, the upper and lower valve stems were fastened, and the pressure in the pressure regulator was released;

(7) the filtrate receiver and the pressure regulator were removed under the condition of ensuring that the valve stems were fastened, the filter bowl was cooled to a room temperature, the filter bowl was kept vertically upward, the valve stems were carefully unfolded, the pressure inside the filter bowl was released, and the pressure shall not released towards the human body, then the cup lid was opened, the drilling fluid was poured off, the filter cake was taken out, the loose material on a surface of the filter cake was washed with slow water flow, the thickness of filter cake was measured with a steel ruler, and the individual component of the filter bowl was finally rinsed.

The mud cake lubrication coefficient was tested by using the Senxin NZ-3A mud cake viscosity coefficient determinator, the specific test method was as follows:

1. Careful reading the description. Checking whether the connections were secure and reliable.

2. The power source was connected, the power switch was turned on, and the digital tubes were lightened. The motor switch was turned on, and it was checked whether the individual rotational parts can run properly. If so, the work sliding plate without a groove surface was rotated to an upward position, and the motor was turned off for use.

3. The reset button was pressed to cause that each of the digital tubes displayed the zero position, the leveling handle was adjusted along the right and left directions, the leveling bubble was observed, work sliding plate without a groove surface was adjusted to a horizontal status. The preparatory work was finished.

4. The mud cake obtained after the filtrate loss performed according to the American Petroleum Institute (API) standard was placed on a plane on the work sliding plate without an L-groove.

5. The sliding block (cuboid) was placed gently on the mud cake and subjected to standing still for 1 minute.

6. The motor switch was turned on and the motor moved the transmission mechanism, such that the work sliding plate moved the sliding block to turn over slowly. The number on the angle display window also increased from zero slowly along with the rolling-over of the work sliding plate.

7. When the sliding block starts to slide along with the rolling-over of the work sliding plate, the motor switch was immediately switched off, and the motor was shut off. The angle value on the angle display window was read and recorded.

8. The value of the tangent function corresponding to the angle value was searched from a tangent function table. The value of the tangent function is exactly the friction coefficient of the mud cake.

TABLE 1

| Numbers | Density/ (g/cm³) | Mud cake thickness/ mm | Filtrate loss/mL | Mud cake lubrication coefficient |
|---|---|---|---|---|
| Example 1 | 1.92 | 2.5 | 12.6 | 0.10563 |
| Example 2 | 1.93 | 2.6 | 11.8 | 0.1014 |
| Example 3 | 1.92 | 2.8 | 12.8 | 0.1014 |
| Example 4 | 1.92 | 2.4 | 12.0 | 0.07605 |
| Example 5 | 1.91 | 2.6 | 12.0 | 0.09295 |
| Example 6 | 1.92 | 2.6 | 12.2 | 0.09718 |
| Example 7 | 1.92 | 2.5 | 12.6 | 0.09718 |
| Example 8 | 1.93 | 2.5 | 11.2 | 0.04225 |
| Example 9 | 1.92 | 2.8 | 11.8 | 0.07605 |
| Example 10 | 1.92 | 2.8 | 12.2 | 0.09295 |
| Example 11 | 1.93 | 3.0 | 12.6 | 0.09718 |
| Example 12 | 1.90 | 2.8 | 12.4 | 0.07605 |
| Example 13 | 1.92 | 3.0 | 12.8 | 0.09295 |
| Example 14 | 1.93 | 3.0 | 13.4 | 0.09718 |
| Example 15 | 1.91 | 3.1 | 13.6 | 0.10563 |
| Example 16 | 1.89 | 3.2 | 15.0 | 0.10563 |
| Example 17 | 1.90 | 3.2 | 14.6 | 0.10563 |
| Example 18 | 1.88 | 3.2 | 14.8 | 0.10563 |
| Example 19 | 1.89 | 3.2 | 15.0 | 0.10563 |
| Example 20 | 1.94 | 3.2 | 13.8 | 0.10536 |
| Example 21 | 1.94 | 3.2 | 14.6 | 0.16478 |
| Example 22 | 1.93 | 3.4 | 15.0 | 0.10563 |
| Example 23 | 1.92 | 3.2 | 13.8 | 0.10268 |
| Comparative example 1 | 1.86 | 3.4 | 15.0 | 0.10563 |
| Comparative example 2 | 1.90 | 3.6 | 15.8 | 0.16478 |
| Comparative example 3 | 1.90 | 3.4 | 15.1 | 0.16478 |

As can be seen from the data in Table 1:

(1) The drilling fluids of Examples 1-15 have a high temperature and high pressure filtrate loss within a range of 11.2-13.6 mL, and a mud cake thickness between 2.4 and 3.1 mm, and a mud cake lubrication coefficient within a range of 0.04225-0.10563, indicating when the drilling tools encounters the micrometer and nanometer crevices in the stratums, the pore size is reduced due to bridging of the emulsified asphalt with a model EP-2 having larger particle size; the shale pore size is subsequently decreased thanks to filling of the inorganic micrometer-nanometer rigid particles II having small particle size, until the plugging is completed at the final stage due to filling of the inorganic micrometer-nanometer rigid particles I having smaller particle size, thereby performing the effective plugging in regard to the various micrometer and nanometer crevices on the borehole wall; in addition, the drilling fluids are prepared with the appropriate constituents within the content definition ranges, each of the drilling fluids has excellent filtrate loss and borehole wall building performance, and can facilitate formation of the thin and dense mud cake on the borehole wall, enhance the borehole wall, reduce the invasion of the solid and liquid phase of the drilling fluid into the stratum and its damage on the oil and gas reservoir, thereby reaching the object of enhancing the stratum pressure bearing capability.

(2) As compared to the properties of drilling fluids of Examples 1-15, the drilling fluids of the Comparative examples 1-3 have the high temperature and high pressure filtrate loss amounts in excess of 13.6 mL, with a maximum of 15.8 mL, and the thickness of mud cakes exceeding 3.1 mm, with a maximum of 3.6 mm, and the mud cake lubrication coefficients in excess of 0.1014, with a maximum of 0.16478, it demonstrates that the unreasonable compounding of the inorganic micrometer-nanometer rigid particles II, inorganic micrometer-nanometer rigid particles I and emulsified asphalt with a model EP-2 in the drilling fluids, and the unreasonable grading of the particle sizes negatively impact the synergistic plugging effect among the particles and the filtrate loss and borehole wall building properties of the drilling fluids.

(3) Compared with the properties of drilling fluids of Examples 1-15, the drilling fluids of Examples 16-23 have the high temperature and high pressure filtrate loss amounts in excess of 13.6 mL, with a maximum of 15.0 mL, and the thickness of mud cakes exceeding 3.1 mm, with a maximum of 3.4 mm, and the mud cake lubrication coefficients in excess of 0.1014, with a maximum of 0.16478, it demonstrates that the unreasonable particle size grading of inorganic micrometer-nanometer rigid particles III, inorganic micrometer-nanometer rigid particles IV and emulsified asphalt with a model EQS-1 in the drilling fluids negatively impact the synergistic plugging effect among the particles and the filtrate loss and borehole wall building properties of the drilling fluids. In addition, it illustrates that during the filtrate loss and borehole wall building process of the drilling fluids, the effects produced by the compounding and particle size grading of the inorganic micrometer-nanometer rigid particles III, inorganic micrometer-nanometer rigid particles IV and emulsified asphalt with a model EQS-1 are smaller than the reasonable compounding and particle size grading of the inorganic micrometer-nanometer rigid particles II, inorganic micrometer-nanometer rigid particles I and emulsified asphalt with a model EP-2.

(4) Compared with the properties of drilling fluids of Examples 1-15, the drilling fluid of Example 8 has a high-temperature and high-pressure filtrate loss of 11.2 mL, a mud cake thickness of 2.5 mm, and a mud cake lubrication coefficient of 0.04225, each of the indicators is excellent, it demonstrates that the drilling fluid is formed through the matching ratio of 1.5 parts by weight of micrometer-nanometer rigid particles II, 1.5 parts by weight of inorganic micrometer-nanometer rigid particles I and 3 parts by weight of emulsified asphalt with a model EP-2, and during the hydration and borehole wall building process, by means of reasonable compounding and grading of particle sizes of the inorganic micrometer-nanometer rigid particles II, the inorganic micrometer-nanometer rigid particles I and the emulsified asphalt with a model EP-2, the particles are pressed against each other, tightly bonded, and alternatively plugged to form a more compact and tenacious mud cake, and effectively improves the stratum pressure bearing capacity.

To sum up, the present application provides a drilling fluid system for enhancing stratum pressure bearing capacity, the drilling fluid exhibits desirable dehydration and borehole wall building properties by means of synergistic effect of rigid and flexible plugging materials with various particle size, and can form thin and dense mud cake, effectively plug micrometer and nanometer crevices of the shale, and prevent the penetration of a filtrate fluid of the drilling fluid filtrate through permeable apertures, thereby enhancing the stratum pressure bearing capacity.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

What is claimed is:

1. A drilling fluid for enhancing stratum pressure bearing capacity comprising water, bentonite, low adhesive aggregation anionic cellulose, lignite resin, high temperature resistant and salt resistant filtrate reducer, silanol inhibitor, inorganic micrometer-nanometer rigid particles and emulsified asphalt with a particle size selected from 10-150 μm; wherein
   the bentonite is 2-9 parts by weight, the low adhesive aggregation anionic cellulose is 0.1-1 parts by weight, the lignite resin is 1-5 parts by weight, the high temperature resistant and salt resistant filtrate reducer is 0.1-2 parts by weight, the silanol inhibitor is 0.1-2 parts by weight, the inorganic micrometer-nanometer rigid particles are 0.5-5 parts by weight, the emulsified asphalt is 1-10 parts by weight, based on 100 parts by weight of water, and
   the inorganic micrometer-nanometer rigid particles contain two types of inorganic micrometer-nanometer rigid particles selected from inorganic micrometer-nanometer rigid particles I having a particle size of 0.1-10 μm and inorganic micrometer-nanometer rigid particles II having a particle size of 10-20 μm.

2. The drilling fluid of claim 1, wherein the bentonite is 3-5 parts by weight, the low adhesive aggregation anionic cellulose is 0.3-0.7 parts by weight, the lignite resin is 1.5-3 parts by weight, the high temperature resistant and salt resistant filtrate reducer is 0.5-1.5 parts by weight, the silanol inhibitor is 0.5-1.5 parts by weight, the inorganic micrometer-nanometer rigid particles are 1-3 parts by weight, and the emulsified asphalt is 1.5-5 parts by weight, based on 100 parts by weight of water.

3. The drilling fluid of claim 1, wherein the low adhesive aggregation anionic cellulose is a cellulose ether-based derivative;
   and/or the lignite resin is a condensed polycyclic aromatic organic compound;
   and/or the high temperature resistant and salt resistant filtrate reducer comprises a polymer derived from a structural unit of 2-acrylamido-2-methylpropanesulfonic acid;
   and/or the silanol inhibitor is prepared from tertiary chlorosilane and ethanol.

4. The drilling fluid of claim 3, wherein the low adhesive aggregation anionic cellulose is a water-soluble cellulose ether-based derivative.

5. The drilling fluid of claim 1, wherein the inorganic micrometer-nanometer rigid particles comprise the inorganic micrometer-nanometer rigid particles I having a particle size of 1-5 μm and the inorganic micrometer-nanometer rigid particles II having a particle size of 8-16 μm.

6. The drilling fluid of claim 1, wherein the weight ratio of the inorganic micrometer-nanometer rigid particles I to the inorganic micrometer-nanometer rigid particles II is 0.8-1.5:1.

7. The drilling fluid of claim 6, wherein the weight ratio of the inorganic micrometer-nanometer rigid particles I to the inorganic micrometer-nanometer rigid particles II is 1:1.

8. The drilling fluid of claim 1, wherein the emulsified asphalt has a particle size selected from 20-100 μm.

9. The drilling fluid of claim 1, wherein the drilling fluid further comprises a weighting agent, which is a barite; the weighting agent is 1-5 parts by weight, based on 100 parts by weight of water.

10. The drilling fluid of claim 9, wherein the weighting agent is 1-3 parts by weight based on 100 parts by weight of water.

11. A method of preparing the drilling fluid for enhancing stratum pressure bearing capacity of claim 1 comprising the following steps:
(1) subjecting the bentonite to a pre-hydration treatment to obtain a pre-hydrated bentonite slurry;
(2) stirring and mixing the pre-hydrated bentonite slurry with the low adhesive aggregation anionic cellulose, the lignite resin, the high temperature resistant and salt resistant filtrate reducer, the silanol inhibitor, the inorganic micrometer-nanometer rigid particles and the emulsified asphalt to produce the drilling fluid.

12. The method of claim 11, wherein the conditions of pre-hydration treatment comprise: adding 3-5 parts by weight of bentonite to 100 parts by weight of water under the first stirring conditions to obtain a mixture; adding sodium carbonate to the mixture and blending under the second stirring conditions and standing still to obtain the pre-hydrated bentonite slurry.

13. The method of claim 11, wherein the first stirring conditions and the second stirring conditions each independently comprise a stirring speed of 500-1,500 r/min and a stirring time of 2-4 hours.

14. The method of claim 11, further comprising sodium carbonate, wherein the sodium carbonate carbonate is used in an amount of 0.08-0.12 parts by weight, relative to 100 parts by weight of water.

15. The method of claim 11, wherein the conditions of standing still comprise a standing temperature of 20-30° C. and a standing time of 16-24 hours.

16. A method of using the drilling fluid of claim 1 in a well drilling operation.

* * * * *